United States Patent [19]

Kezran

[11] Patent Number: 4,979,849
[45] Date of Patent: Dec. 25, 1990

[54] FORMING TOOL
[75] Inventor: Mitchell Kezran, Providence, R.I.
[73] Assignee: Precision Industries, Inc., Providence, R.I.
[21] Appl. No.: 439,411
[22] Filed: Nov. 20, 1989
[51] Int. Cl.$^5$ ............................................. B23P 15/30
[52] U.S. Cl. ..................................... 407/107; 407/103; 407/105
[58] Field of Search ............... 407/107, 109, 111, 112, 407/101, 102; 82/158, 160, 161

[56] References Cited

U.S. PATENT DOCUMENTS

| | | | |
|---|---|---|---|
| 3,028,657 | 4/1962 | Almen | 407/107 |
| 3,837,058 | 9/1974 | Barkley et al. | 407/109 |
| 3,959,861 | 6/1976 | Mihic | 407/107 |
| 4,286,901 | 9/1981 | Eckle | 407/109 |
| 4,400,116 | 8/1983 | Buchman et al. | 407/109 |
| 4,480,950 | 11/1984 | Kraft et al. | 407/109 |

Primary Examiner—Frederick R. Schmidt
Assistant Examiner—S. Keating Johns
Attorney, Agent, or Firm—Salter & Michaelson

[57] ABSTRACT

A forming tool for generating a predetermined configuration in a rotating metal workpiece includes a tool body having a shelf formed thereon, a shim on the shelf, a cutting insert having a cutting edge on the shim and a clamp assembly for clamping the insert and the shim on the tool body. The clamp assembly includes a clamp member having top and bottom sides, and a pair of screws for securing the clamp member on the tool body. The clamp member has a pair of substantially parallel elongated front and rear clamping pads formed on the bottom side thereof and it is mounted so that one of the clamping pads is supported on the tool body whereas the other clamping pad engages the insert to secure it on the tool body. The clamp member has an arcuate crown formed on the top side thereof which is oriented so that the apex thereof is substantially parallel to the clamping pads. The screws of the clamp assembly are received in threaded engagement in the tool body and they are oriented so that the heads thereof engage the arcuate crown on the clamp member along a line which is forward of the axes of the screws in order to pivot the clamp member forwardly and downwardly toward the insert to enable the clamp assembly to compensate for variations in the thickness of the insert while utilizing mechanical advantage to insure maximum clamping force.

7 Claims, 1 Drawing Sheet

FORMING TOOL

BACKGROUND AND SUMMARY OF THE INVENTION

The instant invention relates to forming tools and more particularly to an improved forming tool which is operable in a turning operation for generating a predetermined configuration in a rotating metal workpiece.

The use of forming tools to generate various surface configurations in rotating metal workpieces has generally been known for many years. In this regard, a forming tool generally includes a blade or blade portion having a cutting edge which is formed in a prespecified configuration so that it is engageable with a rotating workpiece in order to generate a complimentary surface configuration in the workpiece. A forming tool of this type is generally mounted in a movable tool holding assembly so that the tool is movable toward and away from a rotating workpiece along an axis which is substantially perpendicular to the rotational axis of the workpiece. Accordingly, by moving the forming tool toward the workpiece with the tool holding assembly, the cutting edge of the forming tool is engageable with the workpiece in order to generate a configuration therein which is complimentary to that of the cutting edge.

The applicant's prior U.S. Pat. No. 4,174,916 which represents the closest prior art to the subject invention of which the applicant is aware, discloses a forming tool of the above-described general type comprising a tool body and a cutting blade or insert having a cutting edge thereon, wherein the cutting insert is removably mounted on the tool body, and a removable shim which is engageable with the insert to retain it in position on the tool body. In this regard, because the cutting insert is removable, it can be resharpened or replaced in the event that the cutting edge becomes worn or damaged rather than replacing the entire forming tool. However, it has been found that a forming tool of this type generally does not have a sufficient level of adjustability to enable it to compensate for variations in the thickness of the insert, such as caused by machining or grinding during resharpening.

The instant invention provides an improved forming tool of the type comprising a tool body and cutting insert on the tool body having a cutting edge thereon. More specifically, the forming tool of the instant invention comprises a tool body which is adapted to be received in a tool holder, the tool body having a substantially flat shelf formed thereon, a cutting insert having a cutting edge supported in a predetermined orientation on the shelf so that the cutting edge is engageable with a rotating workpiece, and a clamp assembly on the tool body for clamping the insert to retain it in the predetermined orientation on the shelf. The clamp assembly includes a clamp member having opposite first and second sides, and it includes spaced, substantially parallel, substantially straight elongated front and rear clamping pads on the first side thereof, the clamping pads being located adjacent the front and rear extremities of the clamp member. The clamp member has an arcuate crown formed on the second side thereof which is oriented so that the apex thereof is centrally located on the second side thereof in substantially parallel relation to the clamping pads on the first side of the clamp member. The clamp member is received and assembled in the forming tool so that the rear clamping pad is supported on the tool body and so that the front clamping pad is operable for applying clamping pressures to the insert in a direction toward the shelf in order to retain the insert in position on the tool body. The clamp assembly further includes at least one elongated threaded fastening element which is received in threaded engagement in the tool body and operative for urging the clamp member in a direction toward the insert. The fastening element has an enlarged head having an engagement surface on the underside thereof and it is oriented so that the engagement surface of the fastening element engages the crown on the clamp member along a line which is forward of the axis of the fastening element in order to urge the clamp member toward the insert. In this regard, because the engagement surface of the fastening element engages the crown of the clamp member along a line which is forward of the axis of the fastening element, the fastening element operates to rock the clamp member forwardly and downwardly so that the clamp member is pivoted toward the insert on the rear clamp pad in order to maximize the amount of clamping pressure applied to the insert by the clamp member. The clamp member is preferably supported exclusively on the clamp pads, and the clamp pads are preferably rounded slightly in their forward extents to enable the clamp member to more effectively pivot forwardly and downwardly as it is urged toward the insert. The tool body is preferably formed with a front face thereon and the shelf is preferably formed so that it extends rearwardly from the front face of the tool body. Further, the tool body preferably has a substantially straight rail formed thereon which defines the rear extremity of the shelf and engages the insert to further position it in the predetermined orientation on the shelf. The tool is preferably constructed so that when the insert is assembled on the tool body with the rear extremity thereof in engagement with the rail, the rail is substantially parallel to both the clamping pads and the crown on the clamp member. The forming tool preferably further includes a shim between the insert and the shelf and the insert is preferably supported on the shim on the shelf. Further, the insert is preferably formed so that the cutting edge thereof is substantially parallel to the clamping pads and the crown on the clamp member when the insert is assembled on the tool body. Still further, the tool preferably includes a pair of substantially parallel threaded fastening elements which are spaced along a line which is substantially parallel to both the crown and the front and rear clamping pads and operative for urging the clamp member toward the insert in the above-described manner. The forming tool also preferably includes a locator pin on the shelf adjacent to the rail, the locator pin having a lower portion of a first sectional dimension and an upper portion of a different second sectional dimension. The shim and the insert preferably have notches formed therein along the rear extremities thereof. The lower portion of the locator pin is preferably received in the notch in the shim and the upper portion of the locator pin is preferably received in the notch in the insert when the shim and the insert are assembled on the tool body. Further, the locator pin, the insert, the shim and the notches are preferably dimensioned so that they cooperate to prevent improper assembly of the insert on the tool body in a position wherein the insert is received between the shim and the shelf.

It has been found that the forming tool of the instant invention has specific advantages over the heretofore available forming tools. In particular, because of the manner in which the fastening element is operative for rocking or pivoting the clamp member forwardly and downwardly toward the insert, the clamp member is operative for applying increased clamping pressures to the insert. Further, because of this same feature, the clamp assembly has an increased level of adjustability to enable it to compensate for variations in insert thickness resulting from machining or grinding thereof during resharpening procedures. Further, because the front face and the rail on the tool body and the front and rear clamping pads and the crown on the clamping plate are preferably all substantially parallel, they more effectively cooperate to secure and retain the insert on the tool body by applying clamping pressures thereto with the clamping plate along a line which is substantially parallel to the cutting edge of the insert.

Accordingly, it is a primary object of the instant invention to provide a forming tool having a tool body, a removable cutting insert on the tool body, and a clamp assembly for clamping the insert in a predetermined position on the tool body, wherein the clamp assembly is adapted to compensate for variations in the thickness of the insert.

Another object of the instant invention is to provide a forming tool having a tool body, a removable cutting insert on the tool body, and a clamp assembly for clamping the insert on the tool body, wherein the clamp assembly is operable for applying increased clamping pressures to the insert.

Other objects, features and advantages of the invention shall become apparent as the description thereof proceeds when considered in connection with the accompanying illustrative drawings.

DESCRIPTION OF THE DRAWING

In the drawings which illustrate the best mode presently contemplated for carrying out the present invention.

DESCRIPTION OF THE INVENTION

Figure 1:
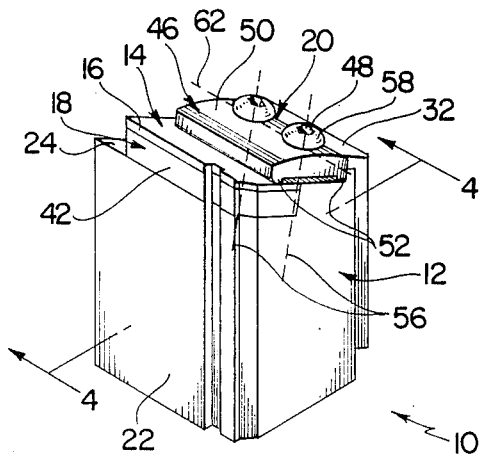
FIG. 1 is a front perspective view of the forming tool of the instant invention.
Figure 2:
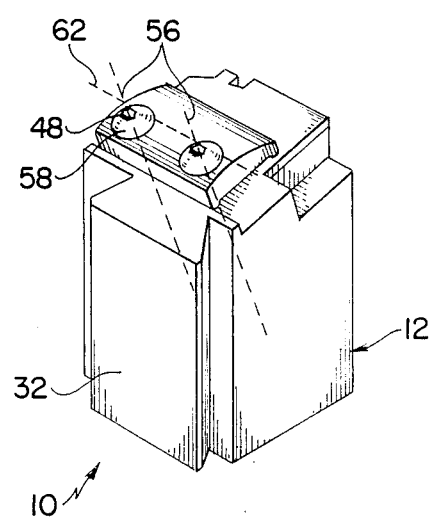
FIG. 2 is a rear perspective view thereof.
Figure 3:
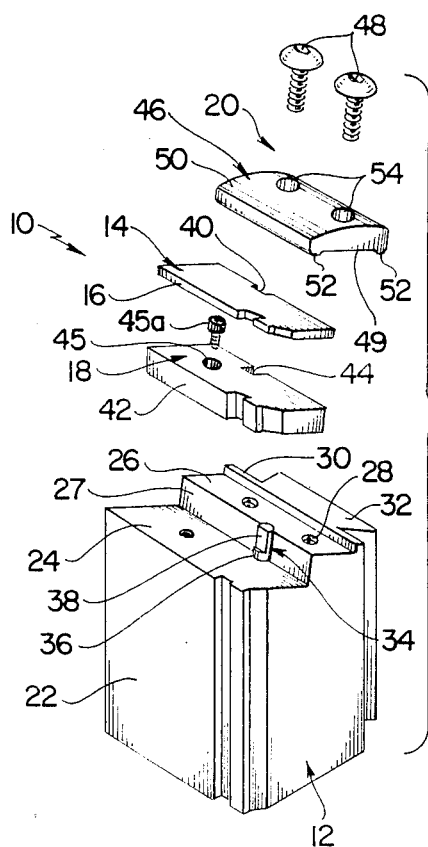
FIG. 3 is a front exploded perspective view thereof.
Figure 4:
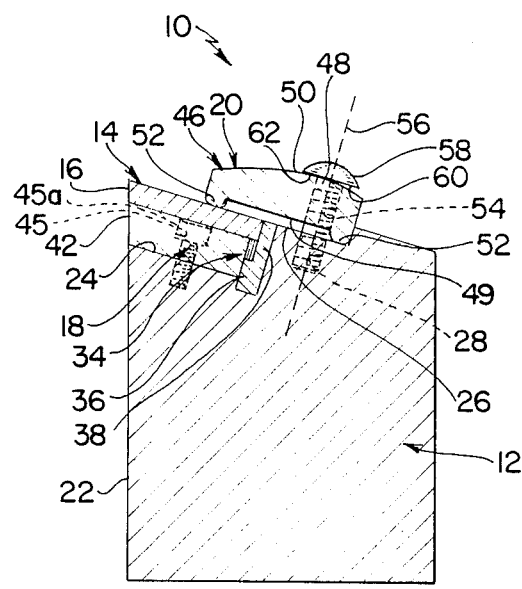
FIG. 4 is a sectional view taken along line 4—4 in FIG. 1.

Referring now to the drawing, the forming tool of the instant invention is illustrated in FIGS. 1-4 and generally indicated at 10. The forming tool 10 preferably comprises a tool body generally indicated at 12, a cutting insert generally indicated at 14 having a cutting edge 16 thereon, a shim generally indicated at 18, and a clamping assembly generally indicated at 20. In assembled relation, the cutting insert 14 and the shim 18 are assembled on the tool body 12 so that the shim 18 is positioned between the insert 14 and the tool body 12 and the clamping assembly 20 is assembled on the tool body 12 so that it is operative for applying clamping pressures to the insert 14 in order to retain it in a predetermined orientation on the tool body 12. In this regard, because of the manner in which the clamping assembly 20 is operative for applying clamping pressures to the insert 14, the insert 14 is securely and rigidly retained in a predetermined orientation on the body 12 wherein the cutting edge 16 is engageable with a rotating workpiece in order to generate a configuration in the workpiece which is complimentary to that of the cutting edge 16. Further, because of the manner in which the clamping assembly 20 is operative for applying clamping pressures to the insert 14, the clamping assembly 20 is adjustable to compensate for variations in the thickness of the insert 14 resulting from machining thereof during resharpening operations.

The tool body 12 preferably comprises a steel block having a front face 22 and a substantially flat upper shelf 24 which extends rearwardly from the front face 22 to define the forward upper extremity of the tool body 12. The tool body 12 further comprises an upwardly projecting rail 26 having a front edge 27 which is preferably substantially parallel to the front face 22 and defines the rear extremity of the shelf 24. A pair of spaced, threaded apertures 28 extend downwardly from the upper surface of the rail 26 into the tool body 12. The apertures 28 are preferably substantially parallel, and they are preferably uniformly spaced rearwardly from the front edge 27 for reasons which will hereinafter be more fully set forth. Formed along the rear edge of the rail 26 is a rear lip 30 and a vertically disposed dovetail element 32 is formed on the rear end of the body portion 12. The dovetail-shaped element 32 is of conventional configuration and it is adapted to be received in a tool holding assembly for securing the forming tool 10 in a turning apparatus so that the cutting edge 16 of the insert 14 is engageable with a rotating workpiece in order to generate a predetermined surface configuration therein in a manner well known in the art.

Also included in the tool 10 is a locator pin generally indicated at 34, including a substantially cylindrical lower portion 36 having a first predetermined sectional dimension and a partially flattened upper portion 38 having a second predetermined sectional dimension which is different from that of the lower portion 36. The locator pin 34 is mounted and secured in the tool body 12 so that it extends upwardly from the shelf 24 along the front edge 27 of the rail 26. As illustrated, the locator pin 34 is positioned so that the lower portion 36 thereof projects forwardly from the front edge 27 by a greater amount than the upper portion 38.

The insert 14 is preferably made of a suitable hardened metal and the cutting edge 16 thereof is formed in a predetermined configuration which is complimentary to that of the desired surface configuration to be generated in a rotating workpiece. A notch 40 is formed along the rear edge of the cutting insert 14, the notch 40 being dimensioned to receive the upper portion 38 of the locator pin 34, but not the lower portion 36 thereof. The notch 40 is further positioned so that when the cutting insert 14 is assembled in the tool 10 with the upper portion 38 of the locator pin 34 received in the notch 40, the insert 14 is positioned in substantially aligned relation with the shelf 24.

The shim 18 is preferably made of a suitable metal in the same general configuration as the cutting insert 14 and it includes a front face 42 which is preferably of substantially the same configuration as the cutting edge 16. The shim 18 also has a notch 44 formed along the rear edge thereof, although the notch 44 is adapted and dimensioned for receiving the lower portion 36 of the locator pin 34 therein as opposed to the upper portion 38 and hence the notch 44 is somewhat larger than the notch 40 in the cutting insert 14. A counterbored aperture 45 is formed in the shim 18, and a screw 45a is received in the aperture 45 and received in threaded engagement in a corresponding threaded aperture in the tool body 12 for retaining the shim 18 thereon.

The clamp assembly 20 comprises a clamp member generally indicated at 46 and a pair of screws 48. The clamp member 46 has a first or bottom side 49 and a second or top side 50 and a pair of rounded elongated clamping pads 52 is formed on the bottom side 49. As illustrated, the pads 52 are formed along the front and rear extremities of the bottom side 49 and they are positioned so that when the clamp assembly 20 is assembled on the tool body 12, the pads 52 are substantially parallel to both the front face 22 and the front edge 27. As also illustrated, the pads 52 are rounded slightly in their forward extents. The second or upper side 50 of the clamping plate 46 has a centrally disposed rounded crown formed thereon which is oriented so that the apex thereof is substantially parallel to the pads 52 and hence also substantially parallel to the front face 22 and the front edge 27 when the clamp member 46 is assembled on the body portion 12. A pair of spaced, substantially parallel bores 54, which are dimensioned for receiving the screws 48, extends downwardly through the clamping plate 46. The screws 48 preferably comprise threaded button-head screws having longitudinal axes 56 and heads 58 having substantially flat engagement surfaces 60 on the undersides thereof. As illustrated most clearly in FIG. 4, the apertures 28 and the bores 54 are oriented so that when the clamp assembly 20 is assembled on the tool body 12, the engagement surfaces 60 of the heads 58 engage the crowned upper side 50 of the clamp member 46 along a line 62 which is spaced forwardly from the axes 56 of the screws 48. Accordingly, the heads 58 of the screws 48 tend to rock or pivot the clamp member 46 forwardly and downwardly about the rear clamping pads 52 in order to apply increased clamping pressure to the insert 14 in a direction toward the shelf 24.

In assembled relation, the shim 18 is positioned on the shelf 24 and the insert 14 is positioned on the shim 18 so that the cutting edge 16 and the front face 42 are substantially aligned with the front face 22 of the tool body 12. When the insert 14 and the shim 18 are assembled on the tool body 12 in this manner, the lower portion 36 of the locator pin 34 is received in the notch 44 in the shim 18, whereas the upper portion 38 of the locator pin 34 is received in the notch 40 in the insert 14. In this regard, because of the different dimensions of the notches 40 and 44 and the upper and lower portions 38 and 36, respectively, of the locator pin 34, it is impossible to inadvertently assemble the insert 14 and the shim 18 in incorrect positions wherein the insert 14 is received on the shelf 24 and the shim 18 is received on the insert 14. In any event, when the insert 14 and the shim 18 are assembled on the tool body 12 in the manner illustrated, the rear edges thereof engage the front edge 27 of the rail 26 to further maintain them in position on the tool body 12. The clamp member 46 is assembled on the tool body 12 so that the rear clamping pad 52 engages the upper surface of the rail 26 and the forward clamping pad 52 engages the upper surface of the insert 14. Since the crown on the upper side 50 of the clamp member 46 is substantially parallel to the clamping pads 52, the front face 22 and the front edge 27, the line 62 along which the screw heads 58 engage the upper side 50 of the clamp member 46 is also substantially parallel to the front face 22 and the front edge 27. Accordingly, when clamping pressure is applied to the insert 14 by the forward clamping pad 52, the clamping pressure is applied along a line which is substantially parallel to the front face 22 and the front edge 27. Further, because the screw heads 58 engage the upper side 50 along a line 62 which is substantially parallel to the front face 22 and the front edge 27 and which is forward of the axes 56, the screw heads 58 operate to pivot or rock the clamp member 46 forwardly on the rear clamping pad 52 in order to apply increased clamping pressure to the insert 14. Still further, because the clamp assembly 20 is adapted to enable the clamp member 46 to rock forwardly and downwardly in this manner, the clamp assembly 20 is adjustable to compensate for minor variations in the thickness of the insert 14. As a result, the insert 14 can be ground down slightly during resharpening procedures without affecting the ability of the clamp assembly 20 to firmly secure the insert 14 and the shim 18 on the body portion 12 in the manner illustrated.

It is seen therefore that the instant invention provides an effective and versatile forming tool for generating a predetermined configuration in a rotating workpiece in a turning operation. The clamp assembly 20 is operative for firmly and positively clamping the insert 14 and the shim 18 on the tool body 12. Further, the clamp assembly 20 is adapted so that it can compensate for variations in the thicknesses of the cutting insert 14 and/or the shim 18. Consequently, for these reasons as well as the other reasons hereinabove set forth, it is seen that the tool 10 represents a significant advancement in the machine tool art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A forming tool for use in a turning operation to generate a predetermined configuration in a rotating workpiece comprising a tool body which is adapted to be received in a tool holder, said tool body having front and rear sides and having a shelf thereon which extends rearwardly from said front side, a cutting insert having a cutting edge supported in a predetermined orientation on said shelf so that said cutting edge is adjacent said front side and engageable with said workpiece and a clamp assembly on said tool body for clamping said insert to retain it in said predetermined orientation on said shelf, said clamp assembly including a clamp member having opposite first and second sides and including spaced, substantially parallel, substantially straight elongated front and rear clamping pads on the first side thereof, said rear clamping pad being supported by said tool body, said front clamping pad being operable for applying clamping pressure to said insert in a direction toward said shelf, the second side of said clamp member having an arcuate crown formed thereon, said crown having an elongated centrally disposed apex which is substantially parallel to said clamping pads, and at least one elongated threaded fastening element, said fastening element being received in threaded engagement in said tool body and being operable for engaging said clamp member to urge the latter in a direction toward said insert, said fastening element having a longitudinal axis and an enlarged head, the head of said fastening element having an engagement surface on the under side thereof, the rearmost point of engagement between the engagement surface of said fastening element head and the second side of said clamp member falling along a line which is forward of said axis for urging said clamp member toward said insert.

2. In the forming tool of claim 1, said clamp member being supported exclusively on said clamping pads.

3. In the forming tool of claim 2, said clamping pads being rounded slightly in their forward extents.

4. In the forming tool of claim 1, the front side of said tool body being defined by a front face, said shelf extending rearwardly from said front face, said tool body also having a substantially straight rail formed thereon which defines the rear extremity of said shelf, said rail engaging said insert to position said insert in said predetermined orientation on said shelf, said rail being substantially parallel to both said clamping pads and said crown when said insert is in said predetermined orientation.

5. The forming tool of claim 1 further comprising a shim between said insert and said shelf, said insert being supported on said shim on said shelf.

6. In the forming tool of claim 1, said clamping pads and said crown being substantially parallel to said cutting edge when said insert is in said predetermined orientation.

7. The forming tool of claim 1 further comprising a pair of said fastening elements, said fastening elements being substantially parallel, the longitudinal axis of said fastening elements being spaced along a line which is substantially parallel to both the apex of said crown and said front and rear clamping pads, the rearmost points of engagement between the engagement surfaces of said fastening elements and the second side of said clamp member falling along a line which is parallel to said apex and forward of the longitudinal axis of said fastening elements.

* * * * *